US 6,548,125 B2

(12) United States Patent
Warnecke

(10) Patent No.: US 6,548,125 B2
(45) Date of Patent: *Apr. 15, 2003

(54) METHOD OF INTERNALLY COATING A WEAPON BARREL BY MEANS OF A LASER BEAM

(75) Inventor: Christian Warnecke, Unterlüss (DE)

(73) Assignee: Rheinmetall W & M GmbH, Unterlüss (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/559,826

(22) Filed: Apr. 28, 2000

(65) Prior Publication Data

US 2002/0114899 A1 Aug. 22, 2002

(30) Foreign Application Priority Data

Apr. 30, 1999 (DE) .......................................... 199 19 688

(51) Int. Cl.$^7$ ........................... B05D 3/06; B23K 26/04; B23K 26/34; C21D 1/09; C21D 9/10; C21D 6/00
(52) U.S. Cl. ..................... 427/597; 427/554; 427/559; 219/121.64; 219/121.66; 219/121.79; 219/121.8; 148/512; 148/519; 148/525
(58) Field of Search ................................ 427/596, 554, 427/557, 559; 148/221, 512, 519, 525; 219/121.63, 121.64, 121.65, 121.66, 121.78, 121.79, 121.8, 121.81

(56) References Cited

U.S. PATENT DOCUMENTS

| 3,802,933 A | * | 4/1974 | Rausch et al. | |
| 3,830,670 A | * | 8/1974 | Van Thyne et al. | |
| 4,212,900 A | * | 7/1980 | Serlin | 427/597 |
| 4,299,860 A | * | 11/1981 | Schaefer et al. | 148/525 |
| 4,365,136 A | * | 12/1982 | Gottlieb | 148/525 |
| 4,414,038 A | * | 11/1983 | Dausinger et al. | |
| 4,469,532 A | * | 9/1984 | Nicolas | 427/253 |
| 4,832,982 A | * | 5/1989 | Mari et al. | 427/597 |
| 5,387,292 A | * | 2/1995 | Marishige et al. | 427/597 |
| 5,496,593 A | * | 3/1996 | Tsai et al. | 427/597 |
| 5,554,415 A | * | 9/1996 | Turchan et al. | 148/525 |
| 5,839,880 A | * | 11/1998 | Okada et al. | 427/597 |
| 6,040,551 A | * | 3/2000 | Manz et al. | 219/121.65 |

FOREIGN PATENT DOCUMENTS

| DE | 195 44824 | 2/1997 |
| DE | 197 41028 | 11/1998 |
| FR | 2 460 340 | 1/1981 |
| GB | 2 304 873 | 3/1997 |
| WO | 98/34440 | 8/1998 |

OTHER PUBLICATIONS

Chrisey et al, *Pulsed Laser Deposition of Thin Film*, John Wiley & Sons, Inc, N.Y. Excerpt, pp. 90–94, 1994 (No month).*

Copy of Specification as originally filed: U.S. Ser. No. 09/559,825, filed Apr. 28, 2000, Inventor: Christian Warnecke, Title: method of Internally Coating a Weapon Barrel By a Plasma Flame.

* cited by examiner

Primary Examiner—Marianne Padgett
(74) Attorney, Agent, or Firm—Venable; Norman N. Kunitz

(57) ABSTRACT

A method of coating an inner surface of a weapon barrel includes the following steps: directing a laser beam against the inner barrel surface to cause melting of regions thereof; introducing a coating material in one of powder, wire and ribbon form into the laser beam for melting the coating material to produce in the surface regions a molten bath composed of the molten coating material and a material of the weapon barrel; and moving the laser beam inside the weapon barrel axially thereof and relative thereto, whereby the molten substance of the bath becomes rigid as the laser beam moves away therefrom.

4 Claims, 2 Drawing Sheets

METHOD OF INTERNALLY COATING A WEAPON BARREL BY MEANS OF A LASER BEAM

REFERENCE TO RELATED APPLICATION

This application claims the priority of German Application No. 199 19 688.5 filed Apr. 30, 1999, which is incorporated herein by reference.

BACKGROUND OF THE INVENTION

The invention relates to a method of coating an inner surface of a weapon barrel with at least one layer for protecting the inner barrel surface against corrosion.

Because of the significantly augmented performance of present-day ammunition, substantial corrosion phenomena appear particularly in weapon barrels made of steel, due to the high gas temperatures and flow velocities occurring when the weapon is fired. Such corrosion results in a worn weapon barrel before it reaches the period when material fatigue sets in. It has been known to provide the weapon barrels with a hard chromium layer to avoid such corrosion. In the conventional processes the hard chromium is deposited electrolytically on the inner surface of the weapon barrel.

It is, among others, a disadvantage of the known processes that the electrolytically deposited hard chromium layers do not adequately resist the effects of performance-enhanced ammunition. As a result, the chromium layer tends to peel and thus significant corrosions appear on the exposed inner surface portions.

German Offenlegungsschrift (application published without examination) 195 44 824 and German Patent No. 197 41 028 disclose methods for hardening weapon barrels by means of a laser beam. The laser beam is axially introduced into the weapon barrel and is caused to impinge on the inner face of the barrel by means of a beam deflecting optical assembly which is displaceable within the weapon barrel.

SUMMARY OF THE INVENTION

It is an object of the invention to provide an improved method for the internal coating of a weapon barrel by means of which, for avoiding corrosions, coating materials of high melting point may be applied with a high degree of adhesion to the inner barrel surface of the weapon.

This object and others to become apparent as the specification progresses, are accomplished by the invention, according to which, briefly stated, the method of coating an inner surface of a weapon barrel includes the following steps: directing a laser beam against the inner barrel surface to cause melting of regions thereof; introducing a coating material in one of powder, wire and ribbon form into the laser beam for melting the coating material to produce in the surface regions a molten bath composed of the molten coating material and a material of the weapon barrel; and moving the laser beam inside the weapon barrel axially thereof and relative thereto, whereby the molten substance of the bath becomes rigid as the laser beam moves away therefrom.

It is thus the basic principle of the invention to perform an inner coating of the weapon barrel by laser welding by directing on the inner surface of the weapon barrel a laser beam which melts the upper inner surface region of the weapon barrel. The coating material is introduced in powder, wire or ribbon form briefly before the impingement of the laser beam on the inner barrel face and is melted by the laser beam so that in the surface regions of the weapon barrel a molten bath is formed by the molten barrel material and the coating substance which becomes rigid as the laser beam travels further.

By a suitable relative motion between the laser beam and the weapon barrel a surface coating of the inner surface of the weapon barrel may be obtained. Further, by repeating the coating process it is possible to sequentially provide different layers and to adapt the weapon barrel to the respective requirements.

It is a significant advantage of the method according to the invention that high-melting point substances such as niobium, molybdenum, tantalum, hafnium, vanadium, tungsten, zirconium or alloys thereof may be applied in layer thicknesses up to a few millimeters on the inner surface of the weapon barrel. It is noted in this connection that substances such as molybdenum or tantalum cannot be separated from aqueous electrolytes with the known galvanic processes. Further, with the known processes layer thicknesses of only a few tenths of a millimeter may be produced.

The coating may be performed on the entire inner surface of the weapon barrel or on selective length portions thereof. In either case, care has to be taken to adapt the weapon barrel to the intended thickness of the coating before the coating process, that is, the barrel portion to be coated has to have a diameter which corresponds to the weapon caliber plus twice the thickness of the coating.

For performing a coating of the weapon barrel with high-melting point metal salts, such as carbides or nitrides, it has been found advantageous to introduce into the plasma a suitable gas in addition to the metal, for example, methane for forming carbides or nitrogen for forming nitrides.

DESCRIPTION OF THE PREFERRED EMBODIMENTS

Figure 1:
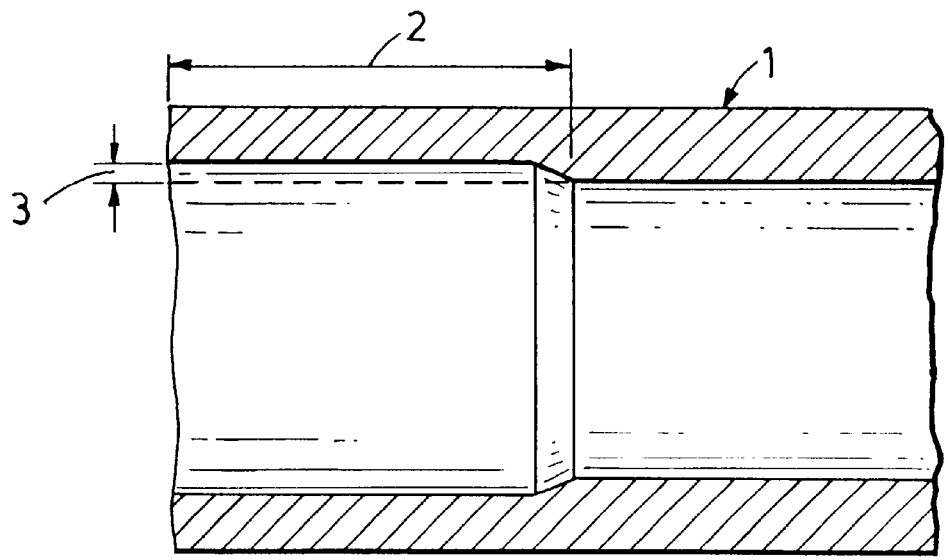
FIG. 1 shows a fragmentary axial sectional portion of a weapon barrel before the coating process.

FIG. 1 shows a weapon barrel 1 whose length portion 2 is to be coated with a hard metal such as niobium. Along the portion to be coated the weapon barrel has an inner diameter which exceeds the weapon caliber by twice the distance 3.

Figure 2:
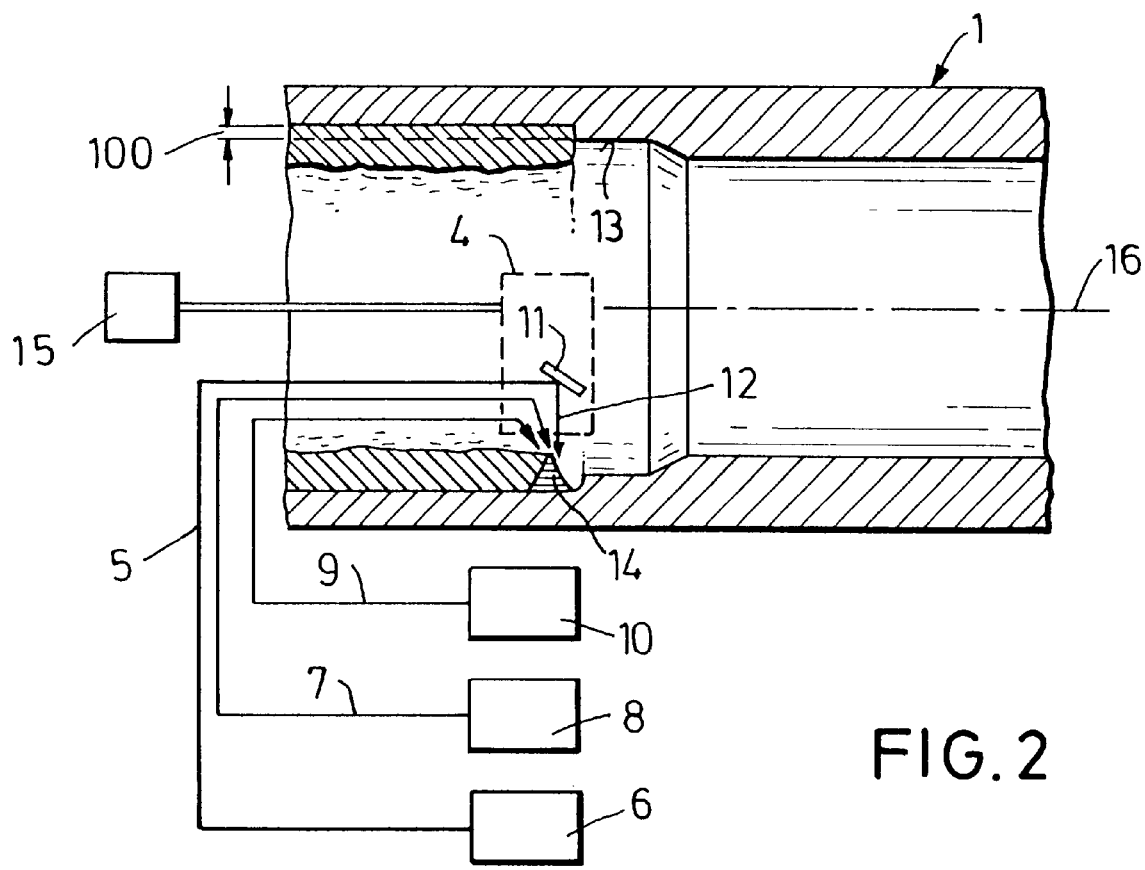
FIG. 2 shows a fragmentary axial sectional view of a weapon barrel during the coating process.

Turning to FIG. 2, for coating an inside barrel surface a laser head 4 is disposed in the weapon barrel 1 and is connected by an optical fiber assembly 5 with a $CO_2$ or an Nd:YAG laser 6 of sufficient power. Further, the laser head 4 is connected by a first hose 7 with a receptacle 8 which contains the coating material in powder form. The laser head 4 is coupled by a second hose 9 with a protective gas source 10 (for example, an argon-filled flask).

The laser head 4 includes a deflecting mirror 11 (which may have a cooling arrangement) for focusing the laser beam 12 emanating from the optical fiber assembly 5 on the barrel surface 13 to be coated.

To perform a coating operation, the laser 6 is activated and the laser beam 12 is directed on the upper surface 13 of the weapon barrel 1 where it melts the inner surface region 100 of the weapon barrel 1. At the same time, the powdery coating substance is, for example, by means of a carrier gas, blown through the laser beam 12 onto the molten region of the inner barrel surface 13. As a result, the laser beam 12 melts the coating substance so that in the surface region 100 of the weapon barrel 1 a molten bath 14 is produced which is composed of the molten barrel material and the molten coating material. Thus, an alloy is formed between the barrel material (substrate) and the coating material. The molten liquid bond of both substances leads to a very high adhesive force between the coating material and the upper surface 13 of the weapon barrel 1.

To prevent the molten liquid coating substance from reacting with the surrounding atmosphere (and to thus avoid the formation of oxides, nitrides or carbides) it has been found advantageous to surround the molten bath 14 by a protective gas coat. For this purpose, the protective gas is blown over the molten bath 14 by a non-illustrated nozzle arrangement mounted at the end of a hose 9 which is connected to a protective gas source 10.

A surface coating of the inner surface 13 of the weapon barrel 1 in the partial region 2 is obtained by helically moving the laser head 4 and the weapon barrel 1 relative to one another. For this purpose, for example, a displacing device 15 axially advances and simultaneously rotates the laser head 4. Or, the laser head 4 is displaced solely axially by the device 15, while the weapon barrel 1 is rotated about its longitudinal axis by a non-illustrated drive.

Figure 3:
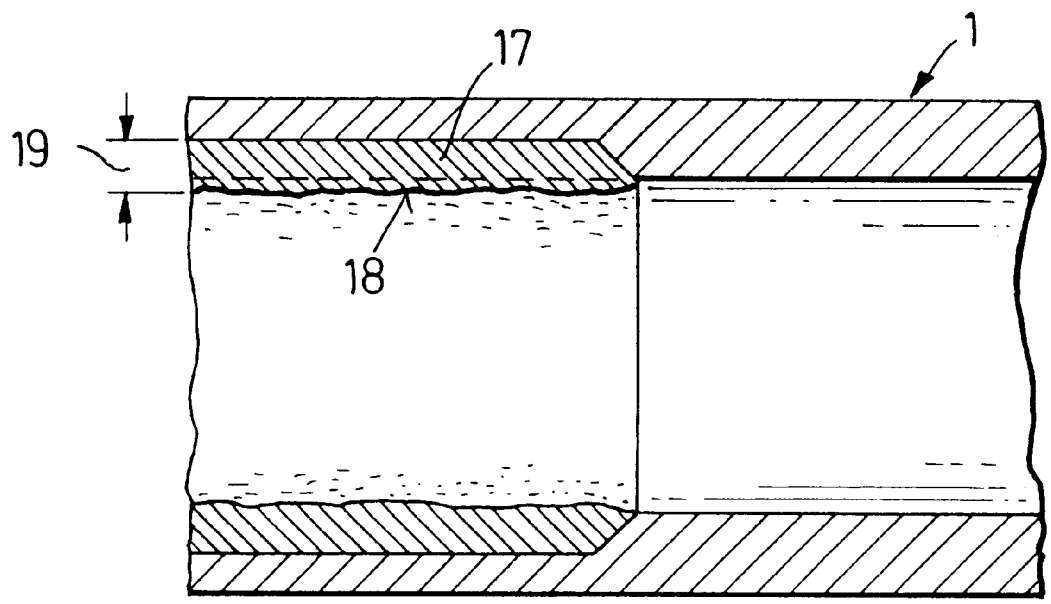
FIG. 3 shows a fragmentary axial sectional view of a weapon barrel after the coating process.
Figure 4:
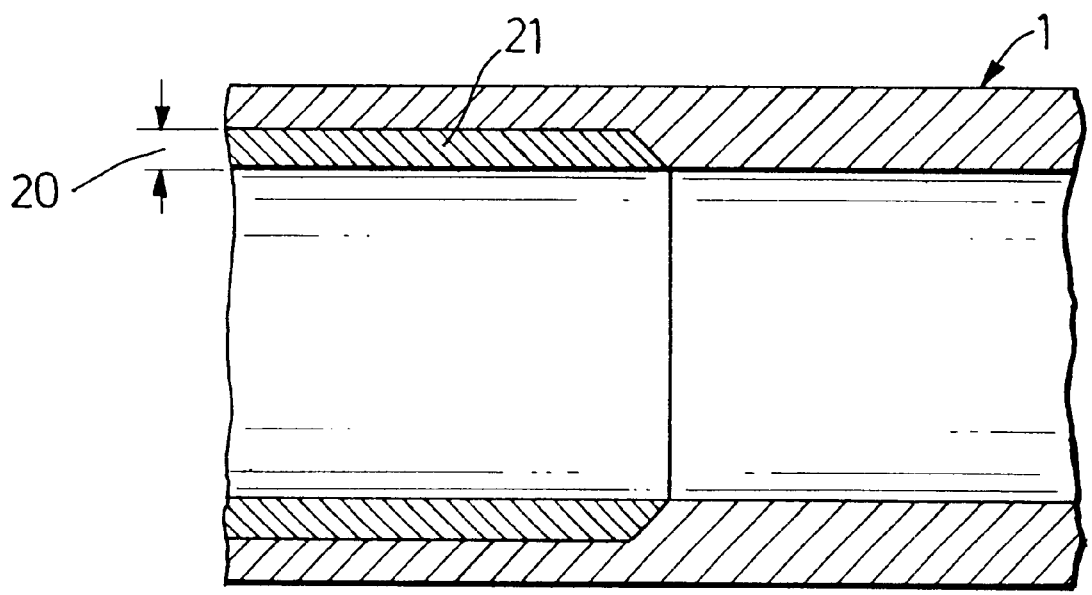
FIG. 4 is a fragmentary sectional axial view of the weapon barrel subsequent to a mechanical treatment performed after the coating process.

After fully applying the layer 17 on the partial length portion 2 of the weapon barrel 1 (FIG. 3), the coated surface is worked by machining, since the layer 17 has a relatively coarse upper surface 18. For this reason, the layer thickness 19 which needs to be originally applied has to be greater than the layer thickness 20 of the layer 21 of the finished weapon barrel, as shown in FIG. 4.

It is to be understood that the invention is not limited to the particular example described above. Thus, for example, for producing the protective gas jacket before the coating process, the entire weapon barrel 1 may be exposed to the protective gas. In the alternative, the protective gas jacket may be dispensed with and the weapon barrel 1 may be evacuated before the coating process.

To improve the strength of adhesion it may be advantageous to sequentially provide on the inner barrel surface several layers of the same or different coating materials.

Further, by using intermediate layers, coating materials may be applied to the substrate (for example, steel) which cannot be welded on directly. Thus, for example, for applying a chromium or molybdenum layer first as intermediate layer a nickel based alloy is applied to the steel substrate.

The layer thicknesses of the top intermediate layers should be between 0.3 and 1.5 mm dependent on the mode of application.

It will be understood that the above description of the present invention is susceptible to various modifications, changes and adaptations, and the same are intended to be comprehended within the meaning and range of equivalents of the appended claims.

What is claimed is:

1. A method of coating an inner surface of a weapon barrel comprising the following steps:
    1) coating a region on the inner surface of the weapon barrel by steps (a) and (b) consisting essentially of
        (a) directing a laser beam against the inner barrel surface to cause melting of regions thereof; and
        (b) introducing a coating material in one of powder, wire and ribbon form into the laser beam for melting the coating material to produce in said regions a molten bath composed of the molten coating material and a material of the weapon barrel; said coating material being selected from the group consisting of niobium, molybdenum, tantalum, haffium, chromium, vanadium, tungsten, zirconium and alloys thereof; and
    2) solidifying the molten bath by
        (c) moving the laser beam inside the weapon barrel axially thereof and relative thereto while performing steps (a) and (b), whereby the molten substance of the bath becomes rigid as the laser beam moves away therefrom.

2. The method of claim 1, which further comprises applying several layers of identical coating material on the inner barrel surface.

3. The method of claim 1, which further comprises applying several layers of different coating material on the inner barrel surface.

4. The method of claim 1, wherein the inner barrel surface is steel and the coating material comprises one of molybdenum and chromium; and wherein the method further comprises depositing a nickel based alloy on the inner barrel surface before depositing said coating material with steps (a) through (c); wherein depositing said nickel based alloy comprises
    (i) directing a laser beam against the inner barrel surface to cause melting of regions thereof; and
    (ii) introducing nickel in powder, wire or ribbon form into the laser beam for melting the nickel to produce in said regions a molten material composed of molten coating nickel and a material of the weapon barrel.

* * * * *